United States Patent Office
3,430,308
Patented Mar. 4, 1969

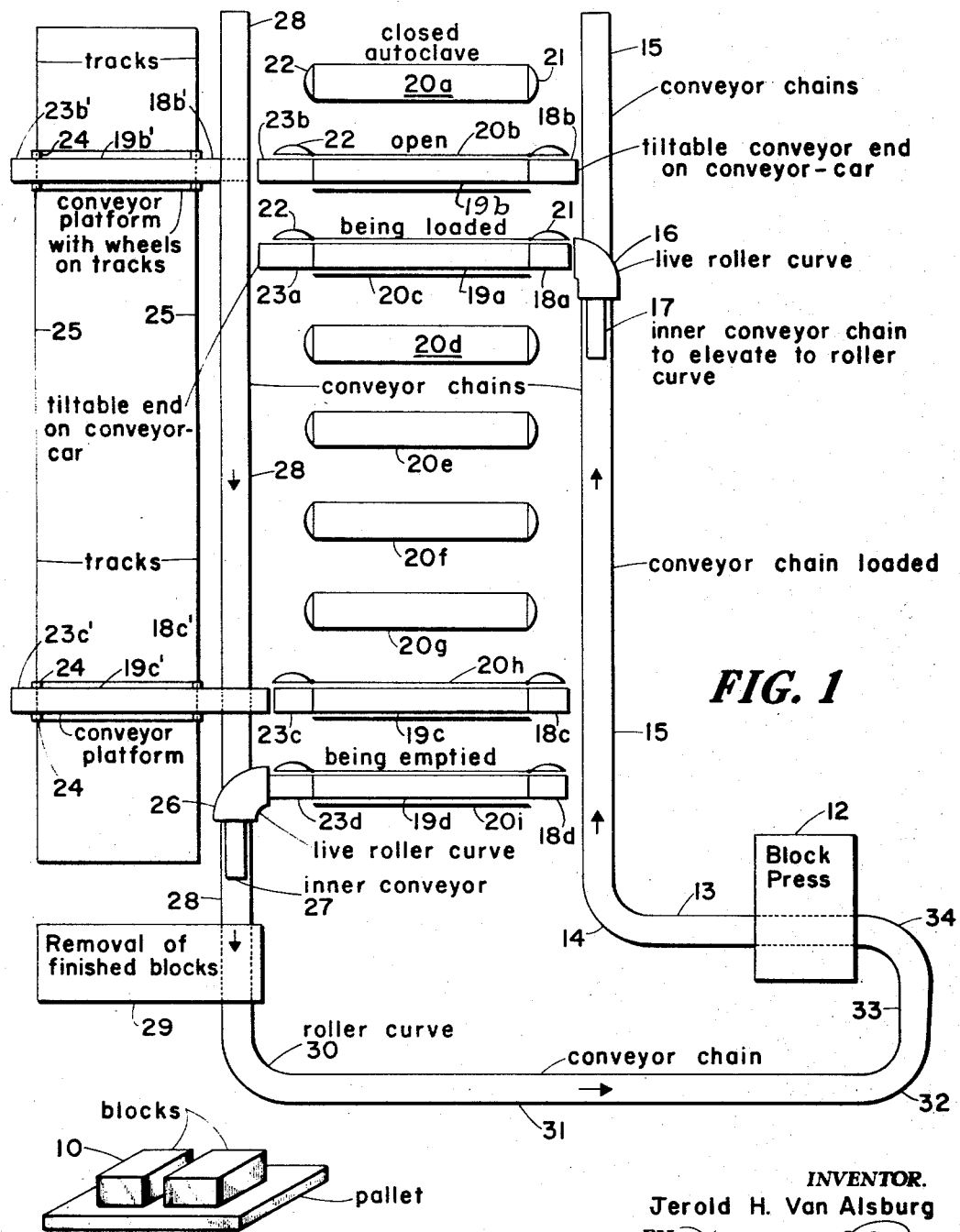

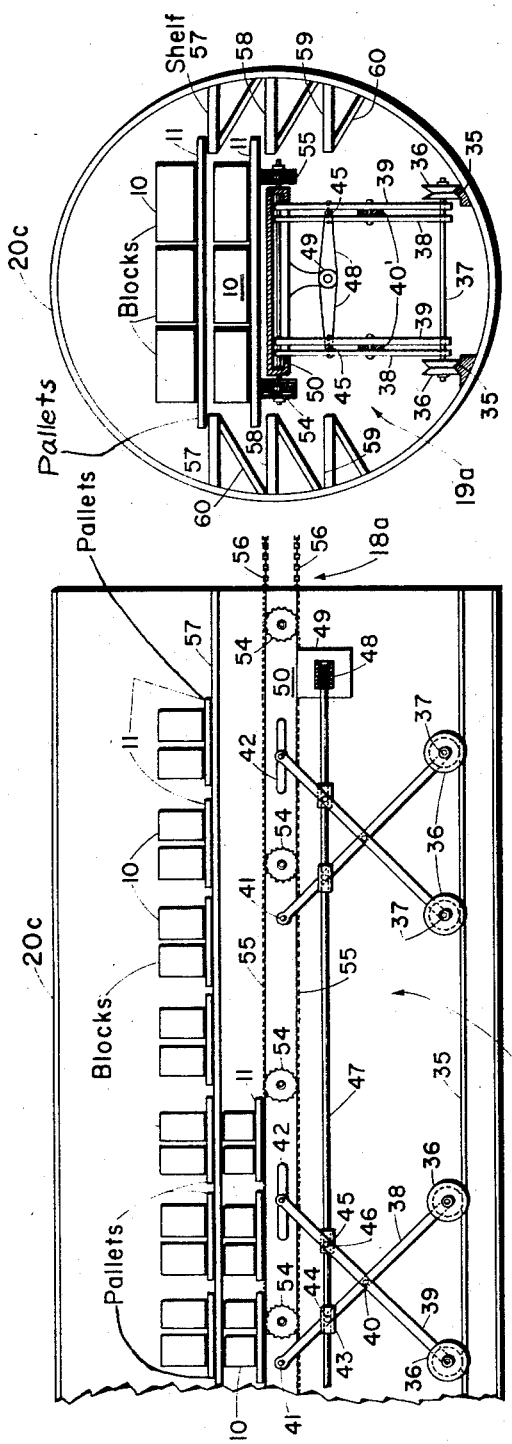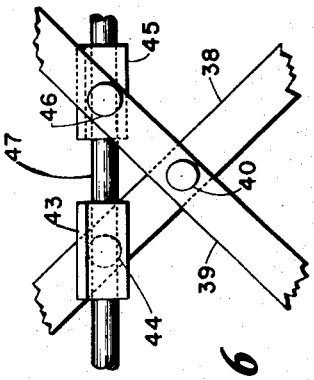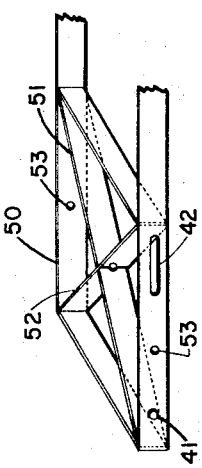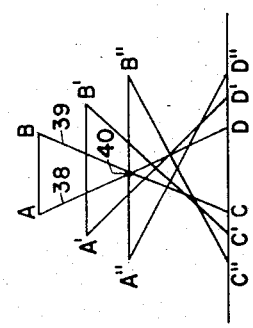

3,430,308
MATERIALS HANDLING AND TREATING
SYSTEM
Jerold H. Van Alsburg, 131 Rio Vista Place,
Santa Fe, N. Mex. 87501
Filed Aug. 25, 1966, Ser. No. 575,141
U.S. Cl. 25—2                                            1 Claim
Int. Cl. B28b 15/00; F27b 9/38; F26b 25/06

ABSTRACT OF THE DISCLOSURE

For curing cement blocks at high temperatures and pressures, use row of horizontal cylindrical autoclaves with inner shelves and track and with connections to steam manifolds at different pressure levels, conveyor belt and selectively placed live roller curve carries loaded pallets to tiltable loading end of conveyor car on said track, conveyor chain on car is lowered to deposit pallets on shelves and later raised to remove pallets from shelves, the car being removed before autoclave is closed and placed on track on a platform which in turn can be moved on transverse track to position conveyor car at selected autoclave for the loading and the unloading operation.

---

This invention relates to an improved system for handling and treating materials supported on pallets and it pertains more particularly to an improved system for the manufacture of cement blocks.

Heretofore, cement blocks have been made by pressure molding such blocks on metal pallets, loading a plurality of the block-carrying pallets onto large, heavy, metal racks provided with a plurality of shelves, carrying the loaded racks by means of forklift trucks or trucks with wheels running on tracks into a pressure vessel of large diameter, curing the blocks therein by treatment with steam about 15 to 150 p.s.i., then removing the racks by means of said trucks and taking the cured blocks off the pallets. An automatic rack-loaded costs about $40,000; an object of this invention is to avoid the necessity of using such a rack-loader. A further object is to eliminate the use of racks altogether; the rack investment for an ordinary plant may be of the order of $20,000 to $25,000 and racks are always warping or otherwise getting out of repair. A still further object is to eliminate the necessity of using trucks in this portion of a plant. Another object is to obtain more effective treating at lower costs. In other words, my object is to provide a system that will be much less expensive to build and to operate and that will be at the same time be more effective and easier to operate. Other objectives will become apparent as the detailed description of the invention proceeds.

Briefly, my invention comprises the use of a battery of small-diameter autoclaves having horizontally aligned inner shelves at their sides and positioning tracks at their bases, a conveyor which extends at least from one end of each autoclave to the other, is mounted on wheels which roll on and are positioned by said track, and is provided with mechanism which lowers the conveyor after it has become fully loaded whereby a closely spaced row of pallets are substantially simultaneously deposited from the conveyor onto the shelves and whereby the conveyor may thereafter be wheeled out of the autoclave so that it will not be subjected to the treating conditions employed for treating the concrete blocks. The pressure-molded blocks on pallets are not stacked on a rack, but are simply carried by a conveyor system to the inlet end of the autoclave being loaded. Here the pallets are lifted to a higher elevation by an inner conveyor, then turned 90° by a roller curve conveyor section, and deposited on a conveyor which traverses the autoclave so that the edges of the pallets will slightly overlap the shelves and the ends of the pallets will be closely spaced, preferably about an inch, more or less, from each other. When the leading pallet reaches the opposite end of the autoclave, a stop mechanism stops the forward motion of the conveyor and the conveyor system and starts the mechanism which lowers the conveyor within the autoclave so that the block-laden pallets are deposited on the shelves. The conveyor within the autoclave may then be employed to similarly deposit another row of loaded pallets on the next lower shelf, but finally it is wheeled outside the autoclave onto a transversely moveable platform so that it can be aligned with and wheeled into an empty autoclave which is next to be loaded.

When the conveyor is removed from the loaded autoclave and the end closures have been secured to hold low or high pressure steam, the autoclave is first connected to a low pressure steam manifold which receives steam from an autoclave that is partially cooled down. After a few hours the loaded autoclave may be connected for a few hours to an intermediate steam pressure manifold which receives steam from an autoclave which is just starting to cool down. Then it can be connected to a high pressure manifold, e.g., at about 100 to 150 p.s.i.g., to complete the accelerated curing procedure. Condensate may be removed from the autoclaves as required.

After the accelerated curing with steam at high pressure the steam can again be transferred and the autoclave is allowed to cool. Then its ends are opened, the conveyor in its lowermost position is wheeled into the lower part under the bottom row of pallets, the level of the conveyor is raised so that it lifts the loaded pallets off the shelves, and the conveyor then discharges the pallets via a live roller curve and a lowering conveyor section to that portion of the conveyor system which leads to the unloading zone, from which the empty pallets go back to the beginning of the operation.

A feature of the conveyor system is the moving of the live roller curve sections with their elevating and lowering sections, respectively, along substantially straight conveyor sections to the end of any desired autoclave, the power for operating them preferably being derived from the main conveyor sections which are relatively straight. A feature of the conveyor that functions inside the autoclave is its pivoted end sections that permit pallets to be conveyed directly thereto regardless of the elevation of the autoclave-enclosed conveyor. Other features will become apparent from the following description of a specific embodiment of the invention.

The invention will be more clearly understood from the following detailed description of my system for the manufacture of cement blocks, read in conjunction with the accompanying drawings which form a part of this disclosure and in which:

FIG. 1 is a schematic flow sheet of the system,

FIG. 2 is a cross-sectional view of an autoclave showing the wheel-supported conveyor supporting pallets above shelf edges, FIG. 3 is a vertical longitudinal section through the autoclave showing the conveyor but omitting certain details for clarity.

FIG. 4 shows a portion of the conveyor-supporting frame.

FIG. 5 is a schematic showing of how the conveyor is positioned at different elevations.

FIG. 6 is a detail showing elevation positioning means,

FIG. 9 is an isometric view of a block-laden pallet.

Figure 7:
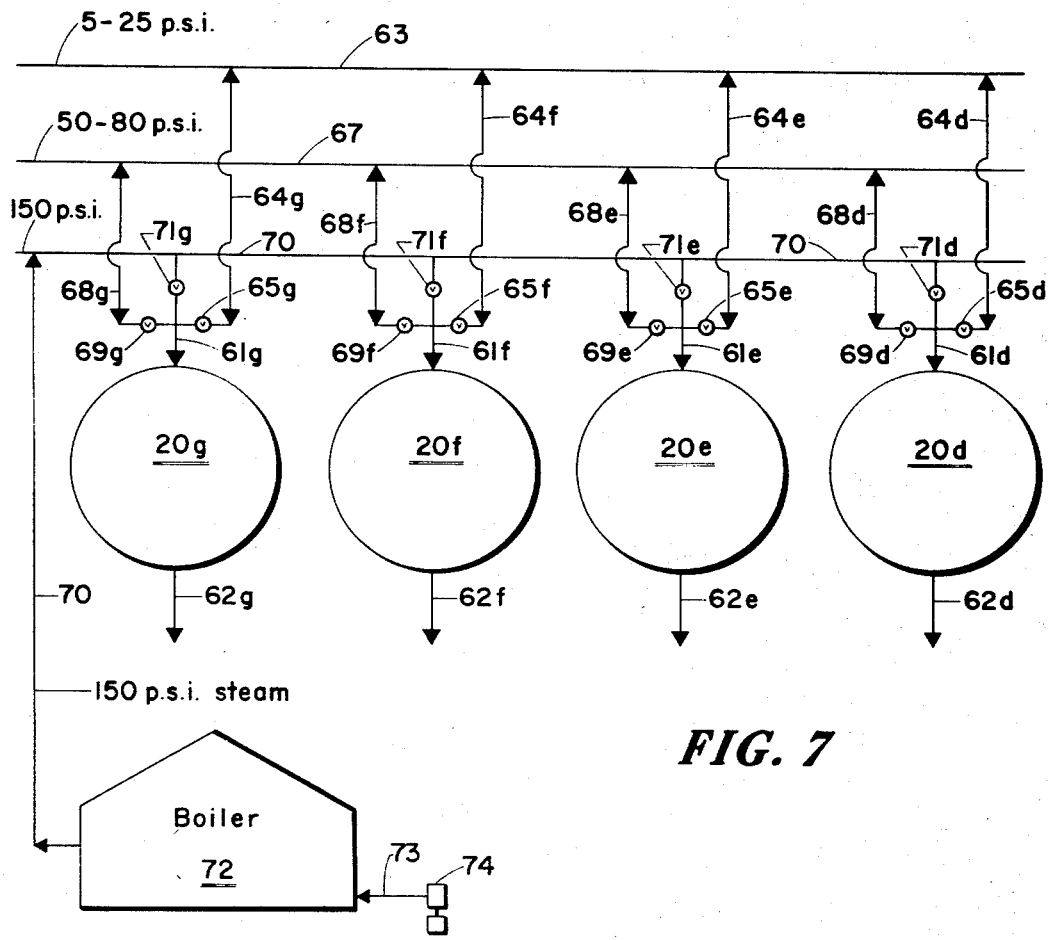
FIG. 7 is a schematic view of the steam treating portion of the system.

Cement blocks 10 are pressure molded and deposited on pallets 11 in any known manner in a "block press house" or station 12. The loaded pallets are carried by a conveyor system comprising straight section 13, live roller curve 14 and main straight section 15 to the vicinity of elevated live roller curve 16, the pallets being elevated from conveyor section 15 to curve 16 by an inner conveyor chain 17, curve 16 and elevator chain 17 both being powered by section 15 of the main conveyor system. Conveyor systems including live roller curves, elevating sections, etc. are well known to those skilled in the art and require no detailed description (Note: Logan Adapto Units catalog No. 61, copyright 1959), but a unique feature of this system is the fact that curve section 16 is moveable in both directions along and above section 15, and when it is positioned opposite the desired autoclave, elevating section 17 is positioned to take power from section 15 so that the pallets are first elevated and then directed toward the desired open-ended autoclave. More specifically, the pallets are discharged from curve section 16 to pivoted end 18a of conveyor 19a which at this moment happens to be in autoclave 20c. There is a whole group or battery of autoclaves 20a, 20b, 20c, . . . 20i, each of which in this example is 3½′ in internal diameter and 50′ in length, and each is provided with end closures 21 and 22 for withstanding pressures of at least 15 p.s.i.g. and preferably 150 p.s.i.g. or more.

In FIG. 1 autoclave 20a has both ends 21 and 22 in closed position, autoclave 20c is being loaded with pivoted end 18a of conveyor 19a receiving loaded pallets from roller curve 16, and autoclave 20i is being unloaded by conveyor 19d and its pivoted end 23d. As indicated at autoclave 20b, the conveyor 19b (with its pivoted ends 18b and 23b) may be wheeled out of the autoclave onto platform 24 which in turn is on wheels running on track 25. Thus any of the conveyors 19a, 19b, 19c, etc. may be positioned in alignment with any of the autoclaves and then wheeled into it for the purpose of loading or unloading it. During the heat treatment with steam under pressure, the conveyors are outside the autoclaves so that they will not be deleteriously affected by the treating conditions. When the contents of an autoclave have become cool after a treatment with high pressure steam, a conveyor such as 19d is wheeled into it and the pallets are lifted and moved out, pivoted section 23d discharging the pallets onto live roller curve 26 which discharges them via inner conveyor chains 27 to the straight portion 28 of the main conveyor system. Curve 26, like curve 16, is designed to move over straight section 28 to any desired position for receiving pallets containing treated blocks from any particular autoclave, and both inner conveyor 27 and live roller curve 26 are driven by being connected to section 28 of the main conveyor system. Treated blocks are removed from the pallets at station 29 after which the pallets pass by roller curve 30, straight section 31, roller curve 32, section 33 and roller 34 back to the loading station or block press house 12 for re-loading.

The inner autoclave structure and the structure of the conveyors are shown in further detail in FIGS. 2 and 3. At the base of each autoclave, e.g. 20c, are tracks 35 for supporting and positioning the wheels 36 which are rotatably mounted on axles 37. One axle is journaled in the lower end of supports 38 and a companion axle is journaled in the lower end of supports 39, these supports being pivotally attached to each other by pivots 40, the upper end of supports 38 being pivotally attached to a frame by pivots 41, and supports 39 having their upper ends slideably mounted in slots 42. Internally threaded nuts 43 are pivotally mounted by pivots 44 to the upper part of supports 38 and internally threaded nuts 45 are pivotally mounted by pivots 46 to the upper part of supports 39. Rod 47 is externally threaded with right hand threads engaging the threads in nut 43 and left hand threads engaging the threads in nut 45 so that when rod 47 is rotated in one direction by chain or gear system 48 and motor 49, nuts 43 and 45 move toward each other and when rod 47 is turned the other direction nuts 43 and 45 move away from each other. Motor 49 is actuated by known types of controls so that it may raise or lower frame 50 which may be suitably reinforced by struts or braces 51 and 52 (see FIG. 4) and which may have bearings or apertures 53 for supporting cogwheels 54 supporting the chains 55 on which the pallets 11 are carried. The manner in which the scissors-like supports raise and lower the level of the conveyor is diagrammatically shown in FIG. 5: with supports 38 and 39 drawn closest together, the level of the conveyor is at A–B; in an intermediate position of the supports, the level of the conveyor is at A′–B′; in their furthest apart position, the level of the conveyor is a A″–B″.

Figure 8:
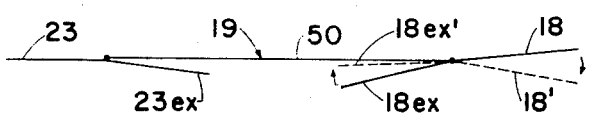
FIG. 8 is a schematic representation of the pivoted ends of the conveyor which functions in the autoclaves.

In FIG. 8 it will be noted that at the right of the conveyor there is a pivoted end 18 which has an extension 18ex at an angle thereto so that by moving 18ex upwards toward frame 50 the pivoted end of the conveyor moves downward to position 18′. Similarly, pivoted end 23 may be raised or lowered by moving 23ex away from or toward frame 50. Controls are employed so that when frame 50 is in its highest position for loading, end 18 will be in its lowest position; the outer portion of end 18 is always aligned with roller curve 16 regardless of the level of conveyor 19. When unloading an autoclave, the outer portion of pivoted end 23 is always at the level of roller curve 26 regardless of the level of conveyor 19. Since the mechanism per se for controlling the elevation of ends 18 and 23 may be of any type known to the art, no detailed description thereof is necessary. The moving chain elements 56 of the pivoted ends 18 and 23 are driven by the mechanism carried by the conveyor.

As seen in FIG. 2, there are spaced and vertically aligned shelves 57, 58 and 59 on each interior side of the autoclaves, each shelf being suitably braced by brackets 60 or other known bracing means. The lateral spacing of the shelves is such that conveyor chains 55 may move upwardly or downwardly therebetween, and so that the pallets 11 will overlap the shelves by an inch or so. The V shaped tracks 35 and wheels 36 position the conveyor 19a so that chains 55 may be raised an inch or so above top shelves 57 by controlled rotation of threaded rods 47. Loading of the autoclave is then initiated by driving chains 55 and 56 at such speed that pallets are received thereon from roller curve 16 at distances of only an inch or so apart, even though they may be spaced several feet apart on section 15 of the conveyor system. When the first pallet reaches the outlet end of the autoclave, both the conveyor in the autoclave and the conveyor system bringing pallets thereto are stopped, conveyor frame 50 and chains 55 are lowered to deposit the row of closely spaced pallets on the top shelf and then to assume a level an inch or so above shelves 58, the end 18a of the conveyor is brought to the level of the discharge end of roller curve 16, and then the conveyor in the autoclave and the conveyor system resume their function of bringing pallets thereto. Any known system of mechanically operated or time switches may be used for this purpose so that no detailed description thereof is necessary. After shelves 58 and 59 are similarly loaded, frame 50 and chains 55 are moved to a low enough position to permit the conveyor to be removed from the autoclave, and it is important that it be so removed because the treating conditions to be used therein would be deleterious to the conveyor and the mechanical and electrical components thereof as well as to lubricant used thereon.

After the conveyor has been removed from a loaded autoclave and the ends of said autoclave have been closed so that, in this example, the autoclave will hold a steam pressure of 150 p.s.i., the treating of the cement blocks 10 is initiated in the system shown in FIG. 7, which shows the portion of the system applicable to autoclaves 20d, 20e, 20f, and 20g. Considering autoclave 20d as an example, it is provided with one or more upper steam lines 61d and one or more lower water drain lines 62d. A low pressure manifold 63 (about 5–25 p.s.i.g., e.g., 10 p.s.i.g.) is connected to line 61d by line 64d containing valve 65d. An intermediate pressure manifold 67 (about 50–80, e.g., 65 p.s.i.g.) is connected to line 61 by line 68d containing valve 69d. A high pressure manifold 70 (about 150 p.s.i.g.) is connected to line 61d via valve 71d. Similar connections exist for each of the autoclaves. The high pressure steam comes from boiler house 72 to which water is introduced by pipe 73 and pump 74.

A loaded autoclave is first connected to the low pressure manifold by opening valve 65d while valves 69d and 71d remain closed. After a few hours the temperature of the blocks undergoing treatment will thus be raised to about 200 to 240° F. Then valve 65d is closed and valve 69d is opened; in two to four hours the temperature of the autoclave contents reaches about 280 to 320° F. Next valve 69d is closed and valve 71d is opened; in two to four hours the temperature of the blocks undergoing treatment may be of the order of 360° F. After a few hours at this high temperature, valve 71d is closed and valve 69d is opened so that steam from a treated autoclave may supply intermediate pressure steam to an autoclave which has just completed its low pressure treatment. Thereafter valve 69d is closed and valve 65d is opened to supply steam to manifold 63. After all of the steam valves have been closed it may take a portion of a day or more of further cooling before the autoclave is ready to be emptied. The emptying is effected by opening the ends of the cooled autoclave, wheeling into it a conveyor adjusted to its lowest level, raising its level to raise the lowest row of pallets from the lowest shelf, then starting the conveyor and the conveyor system so that the pallets are directed by roller curve 26 and inner conveyor 27 down to section 28 of the conveyor system which carries the pallets to the block-removal station 29 as hereinabove described.

While my invention has been described in detail as applied to a particular example thereof, it should be understood that said example is by way of example and not of limitation. The invention may be applied to other materials. Alternative apparatus arrangements and treating conditions will be apparent from the foregoing description to those skilled in the art.

I claim:
1. Apparatus for processing under superatmospheric pressure material supported on pallets, which apparatus comprises:
  (a) a plurality of substantially horizontal autoclaves, each about 3 to 4 feet in diameter and at least about 10 feet long, each provided with movable end closures which in closed position withstand superatmospheric pressures, and each provided with track leading to and extending along the inner base of each autoclave,
  (b) substantially horizontal, vertically aligned shelves at each side of the autoclave, said shelves being laterally spaced to support opposite sides of said pallets and vertically spaced more than the height of the material,
  (c) a conveyor car at least about the length of the autoclaves, which conveyor car has tiltable ends and carries a conveyor chain adjustably mounted over wheels on said track so that its upper carrying surface will be slightly higher than the upper surfaces of each of the shelves which it is to load and so that it may be positioned and moved in and out of the autoclaves on the track leading to and extending along the base of the autoclave,
  (d) mechanism for lowering a conveyor car chain load of pallets onto the edges of horizontally aligned shelves by decreasing the elevation of the conveyor chain on the conveyor car,
  (e) a conveyor car platform, track on said platform for receiving a conveyor car when aligned with an autoclave, wheels supporting the platform for transverse movement, and track on which said last named wheels can be moved from one autoclave to another,
  (f) and a conveyor system including straight and curved sections and including an elevating section, whereby pallets from a loading zone may be conveyed to, elevated to the level of, and directed toward a conveyor car in an autoclave, deposited by said conveyor car on said shelves, treated in said autoclave after the conveyor has been removed therefrom and the end closures thereof have been closed, and thereafter removed from the shelves and from the autoclave by a corresponding conveyor which has been wheeled into the autoclave after the treatment therein.

References Cited
UNITED STATES PATENTS

| | | | |
|---|---|---|---|
| 3,252,200 | 5/1966 | Gulde et al. | 25—142 |
| 198,791 | 1/1878 | Butts | 34—194 |
| 2,521,214 | 9/1950 | Goeller | 280—43.2 X |
| 3,325,870 | 6/1967 | Lacy et al. | 25—2 |
| 2,712,869 | 7/1955 | Belt | 280—43.2 X |

FOREIGN PATENTS 872,479 7/1961 Great Britain.

J. SPENCER OVERHOLSER, *Primary Examiner.*

J. S. BROWN, *Assistant Examiner.*

U.S. Cl. X.R.

25—142; 34—194, 217; 214—16.4